United States Patent [19]
Lannutti et al.

[11] Patent Number: 6,087,432
[45] Date of Patent: Jul. 11, 2000

[54] PARTICLE ENGINEERING FOR TOUGHENED POLYIMIDE-MATRIX COMPOSITES

[75] Inventors: John J. Lannutti; Robert R. Seghi; Jiazhong Luo, all of Columbus, Ohio

[73] Assignee: The Ohio State University Research Foundation, Columbus, Ohio

[21] Appl. No.: 09/126,823

[22] Filed: Jul. 31, 1998

[51] Int. Cl.⁷ .................................................. C08K 3/34
[52] U.S. Cl. ............................................................ 524/492
[58] Field of Search ..................... 524/606, 492

[56] References Cited

U.S. PATENT DOCUMENTS

| 4,578,310 | 3/1986 | Hatfield | 428/334 |
| 5,413,789 | 5/1995 | Hagiwara | 424/409 |

OTHER PUBLICATIONS

Luo, et al., *Mat. Sci. and Eng.* C5, 15–22 (1997).
Luo, et al., *J. of Dental Resch.*, 77 Abst# 519 (1998).
Seghi, et al., *J. of Dental Resch.*, 77 Abst# 1239 (1998).
Seghi, et al., *J. of Dental Resch.*, 75 Abst# 850 (1996).
Luo, et al., *J. Dental Resch.*, 75 Abst# 2177 (1996).
Lou, et al., *J. of Dental Resch.*, 76 Abst# 2455 (1997).
Seghi, et al., *J. of Dental Resch.* 76 Abst# 1967 (1997).

*Primary Examiner*—Paul R. Michl
*Attorney, Agent, or Firm*—Standley & Gilchrest LLP

[57] ABSTRACT

The material of the present invention is a filled polymeric material, the material comprising, or consisting essentially of, a thermosetting polymeric material formed from the at least one monomer; the thermosetting polymeric containing a nano-porous inorganic gel material, the inorganic gel material having a sufficient degree of porosity for the monomer(s) such that the inorganic gel material is capable of bonding to the thermosetting polymeric material during polymerization. The present invention also includes an method for the production of such filled polymeric materials.

26 Claims, 1 Drawing Sheet

PARTICLE ENGINEERING FOR TOUGHENED POLYIMIDE-MATRIX COMPOSITES

This invention was made with Government support under Grant No. DE11306, awarded by NIH (NIDCR). The Government has certain rights in this invention.

TECHNICAL FIELD

The present invention is in the field of polymer matrix composites.

BACKGROUND

Advanced polymer matrix composites have become established high-performance structural materials that enjoy a rapidly expanding range of aerospace applications. The major driving force for the use of these composites is the reduced weight brought about by high stiffness/weight and high strength/weight ratios. Added to this is the potential for significantly lower component cost.

For example, polyimides as matrices offer an unparalleled versatility compared to most other organic matrices. They can be prepared using a variety of starting materials and synthetic methods tailor-made to specific applications. By the appropriate choice of starting materials we can produce desirable variations in glass transition temperature, oxidative stability, toughness, and adhesion. Outstanding thermal stability and relative ease of fabrication have established polyimides as viable matrix materials.

Unfortunately, a factor strongly limiting the commercial applicability of these types of composites is their toughness, or their ability to withstand incidental impacts. The same elevated $T_g$ that makes these materials suitable as high temperature polymer matrices produces an enhanced susceptibility to bird impact, dropped tooling, etc.

Toughness in polyimides is usually addressed by the incorporation of more flexible linkages into the thermoset structure. Unfortunately, along with the additional cost and reduction in thermal capability these methods have so far produced only limited improvements in toughness.

Accordingly, it is an object of the present invention to provide for the toughening of polymeric matrices, such as thermosetting polyimide matrices, using nanoporous particulate reinforcement.

It is also an object of the present invention to improve the effects of particulate reinforcement on overall mechanical properties, such as flexural, impact, and compression strengths.

Further, it is an object of the present invention to integrate successful matrix processing into fiber-reinforced composite manufacturing. The main objective will be to ensure that the presence of small amounts of reinforcing particulates do not compromise the efficiency of the composite formation process.

SUMMARY OF THE INVENTION

In broadest terms, the material of the present invention may be described as a filled polymeric material, the material comprising, or consisting essentially of, a thermosetting polymeric material formed from the at least one monomer; the thermosetting polymeric containing a nano-porous inorganic gel material, the inorganic gel material having a sufficient degree of porosity for the monomer(s) such that the inorganic gel material is capable of bonding to the thermosetting polymeric material during polymerization.

The thermosetting polymeric material used in accordance with the present invention may be selected from the group consisting of polyimides, epoxies, acrylates.

The inorganic gel material used in accordance with the present invention may be selected from the group consisting of silicate gels. It is preferred that the inorganic gel material have a pore volume in the range of from about 0.5% to about 80% volume percent, most preferably in the range of from about 1% to about 30% volume percent. It is preferred that the inorganic gel material is present in an amount in the range of from about 1% to about 40% by weight.

In an alternative embodiment of the present invention, the filled polymeric material additionally may be provided with a fibrous reinforcement, such as a woven fibrous reinforcement, preferably a woven carbon fiber reinforcement present in an amount less than 10% by weight.

It is preferred that the filled polymeric material be substantially free of coupling agents, i.e., materials or chemical agents designed to improve the adhesion between a polymeric phase and a relatively dense inorganic phase. Accordingly, one of the advantages of the preferred embodiment of the present invention is that coupling agents may be eliminated.

The method of the present invention may be described as one for producing a filled polymeric material, the method comprising the steps: (1) obtaining a polymer precursor mixture comprising: (a) at least one monomer capable of polymerizing to form a thermosetting polymeric material; (b) a nano-porous inorganic gel material, the inorganic gel material having a sufficient degree of porosity for the at least one monomer such that the inorganic gel material is capable of bonding to the thermosetting polymeric material upon polymerization; and (2) polymerizing the at least one monomer so as to form a thermosetting polymeric material, causing the inorganic gel material to bond to the thermosetting polymeric material.

The thermosetting polymeric material and inorganic gel material used in accordance with the present invention may be as described above.

Optionally, the polymer precursor mixture may be brought into contact with at a fibrous reinforcement prior to step 2, so as to form a reinforced thermosetting polymeric material upon completion of or concurrent with step 2.

The method of the present invention may also involve the inclusion of a fibrous reinforcement as describe above. Such reinforcements may be included through use of techniques and apparatus known in the art.

Conventional wisdom states that coupling agents improve the adhesion between a polymeric phase and a dense inorganic phase, leading to better properties. For our nanoporous particles, however, coupling clearly has a negative effect. FIG. 1 is a schematic representation of this nano-mechanical polymer-particle coupling. The silica (light phase) is depicted as having a regular array of fine pores. In the absence of coupling agents, these pores are fully penetrated by the monomer. Compared to a dense particle the toughness of this interface will be considerably higher. A propagating fracture event is more effectively blunted by this nanoporous interface.

In an alternative embodiment of the present invention, fly ash or carbon black, may be used in place of, or as a complementary material to, the nanoporous inorganic gel material used in the present invention.

DETAILED DESCRIPTION OF THE PREFERRED EMBODIMENTS

Figure 1:
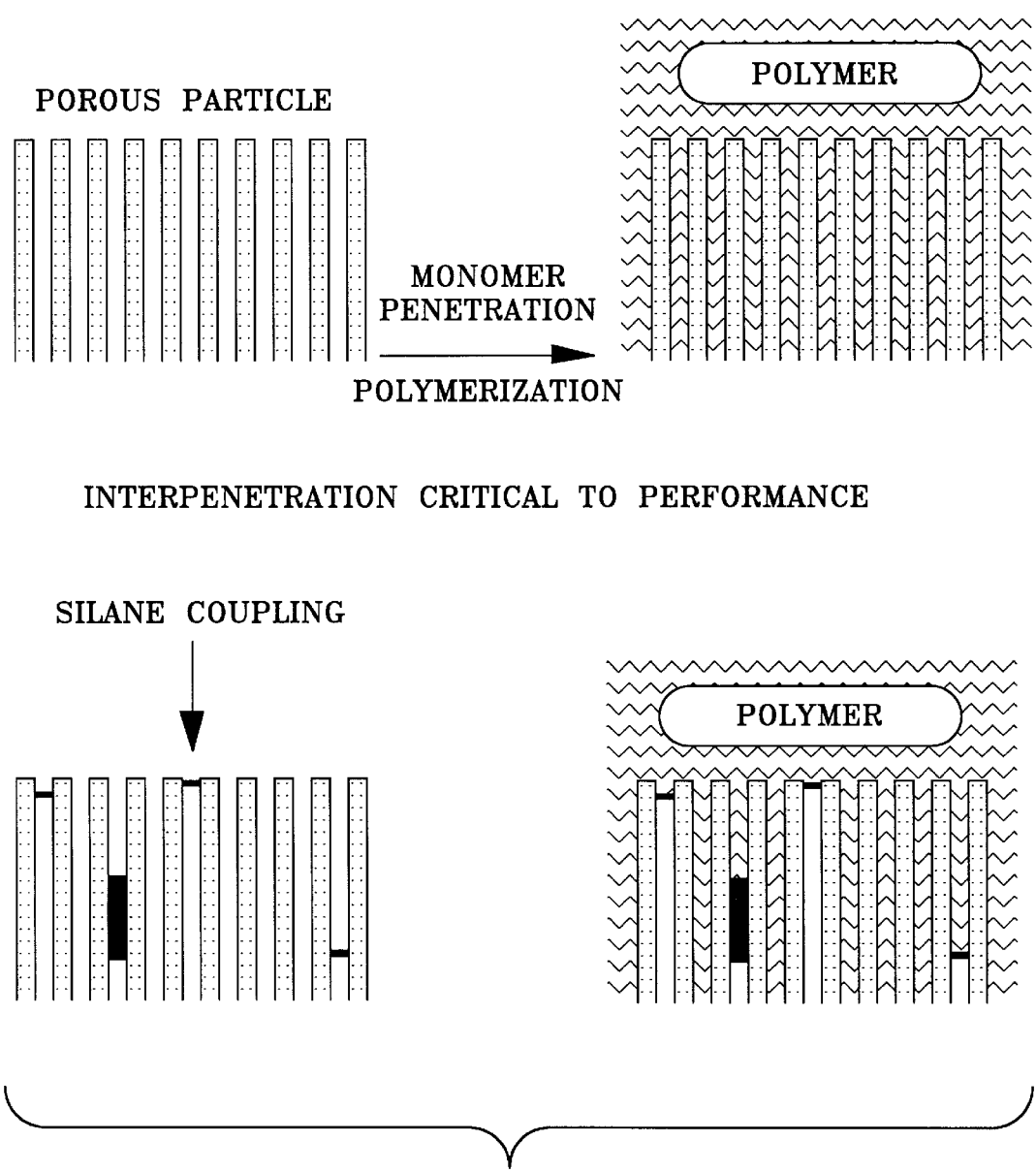
FIG. 1 is a schematic representation of nano-mechanical polymer-particle coupling, representing one embodiment of the present invention.

In accordance with the foregoing summary of the invention, the following describes preferred embodiments of the present invention which are presently considered to be the best mode of the invention.

To produce a nanocomposite of Superimide 800 with silica, the following synthesis is carried out:

The Superimide 800 polyimide powder and the nanoporous silica are weighed out in amounts appropriate for a 10 wt % composite. These components are then ground together, such as in a mortar and pestle or other appropriate grinding apparatus to mix the components together. The resultant mixture is then placed in a metal plate mold and heated to 300° C. Approximately 8000 psi is applied at that temperature. The temperature is then ramped up to 350° C., and held at 350° C. for about 30 minutes. The resultant composite is then allowed to furnace cool to produce a solid, dense composite plate.

The foregoing synthesis may naturally be scaled up by using apparatus such as commercial grinding machines, furnaces and molds, in accordance with known engineering techniques.

Such composites of polyimide and silica exhibited toughness values of about 2 Mpa(0.5)**0.5.

Other similar polyimide composites, in accordance with other embodiments of the present invention, gave the following toughness results:

(1) 90 wt % Chen and Gonsalves PI+10 wt % NaF-catalyzed silica: 0.939 Mpa(m)**0.5 (average of four measurements; SEM shows that this material has some inhomogeneities);

(2) 45 wt % Superimide 800 +~45 wt % chopped C fiber+~10 wt % NaF-catalyzed silica: 0.860 Mpa(m)0.5 (average of five measurements; debonding along the fiber-matrix interfaces is believed to be responsible for the lower toughness); and (3) 90 wt % Superimide 800+10 wt % NaF-catalyzed silica: 2.048 Mpa(m)0.5 (average of eleven measurements) (high: 2.720 Mpa(m)0.5; low: 1.547 Mpa(m)0.5; evidencing considerable microstructural toughening of the polymer phase is obvious; tearing and some pull-out is visible).

The preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, it will be within the ability of one of ordinary skill in the art to make alterations or modifications to the present invention, such as through the substitution of equivalent materials or structural arrangements, so as to be able to practice the present invention without departing from its spirit as reflected in the appended claims, the text and teaching of which are hereby incorporated by reference herein. It is the intention, therefore, to limit the invention only as indicated by the scope of the claims.

What is claimed is:

1. A filled polymeric material, said material comprising:
a thermosetting polymeric material formed by the polymerization of at least one monomer, said thermosetting polymeric material containing a nano-porous inorganic gel material, said inorganic gel material having a sufficient degree of porosity for said at least one monomer such that said at least one monomer enters the pores of said inorganic gel material, and such that said inorganic gel material is capable of bonding to said thermosetting polymeric material during said polymerization of said at least one monomer.

2. A filled polymeric material according to claim 1 wherein said thermosetting polymeric material is selected from the group consisting of polyimides, epoxies, acrylates.

3. A filled polymeric material according to claim 1 wherein said inorganic gel material is selected from the group consisting of silicate gels.

4. A filled polymeric material according to claim 1 wherein said inorganic gel material has a pore volume in the range of from about 0.5% to about 80% volume percent.

5. A filled polymeric material according to claim 1 wherein said inorganic gel material has a pore volume in the range of from about 1% to about 30% volume percent.

6. A filled polymeric material according to claim 1 wherein said inorganic gel material is present in an amount in the range of from about 1% to about 40% by weight.

7. A filled polymeric material according to claim 1 additionally comprising a fibrous reinforcement.

8. A filled polymeric material according to claim 1 additionally comprising a woven fibrous reinforcement.

9. A filled polymeric material according to claim 1 additionally comprising a woven carbon fiber reinforcement present in an amount less than 10% by weight.

10. A method of producing a filled polymeric material, said method comprising the steps:
(1) obtaining a polymer precursor mixture comprising:
(a) at least one monomer capable of polymerizing to form a thermosetting polymeric material;
(b) a nano-porous inorganic gel material, said inorganic gel material having a sufficient degree of porosity for said at least one monomer such that said at least one monomer enters the pores of said inorganic gel material, and such that said inorganic gel material is capable of bonding to said thermosetting polymeric material upon polymerization; and
(2) polymerizing said at least one monomer so as to form a thermosetting polymeric material, causing said inorganic gel material to bond to said thermosetting polymeric material.

11. A method according to claim 10 wherein said thermosetting polymeric material is selected from the group consisting of polyimides, epoxies, acrylates.

12. A method according to claim 10 wherein said inorganic gel material is selected from the group consisting of silicate gels.

13. A method according to claim 10 wherein said inorganic gel material has a pore volume in the range of from about 0.5% to about 80% volume percent.

14. A method according to claim 10 wherein said inorganic gel material has a pore volume in the range of from about 1% to about 30% volume percent.

15. A method according to claim 10 wherein said inorganic gel material is present in an amount in the range of from about 1% to about 40% by weight.

16. A method according to claim 10 wherein said polymer precursor mixture is brought into contact with at a fibrous reinforcement prior to or concurrently with step 2, so as to form a reinforced thermosetting polymeric material upon completion of step 2.

17. A method according to claim 16 wherein said fibrous reinforcement is a woven fibrous reinforcement.

18. A method according to claim 16 wherein said fibrous reinforcement is a woven carbon fiber reinforcement present in an amount less than 10% by weight.

19. A filled polymeric material according to claim 1 wherein said filled polymeric material is substantially free of coupling agents.

20. A method according to claim 10 wherein said filled polymeric material is produced without the addition of coupling agents.

21. A filled polymeric material, said material consisting essentially of:

a thermosetting polymeric material formed by the polymerization of at least one monomer, said thermosetting polymeric material containing a nano-porous inorganic gel material, said inorganic gel material having a sufficient degree of porosity for said at least one monomer such that said at least one monomer enters the pores of said inorganic gel material, and such that said inorganic gel material is capable of bonding to said thermosetting polymeric material during said polymerization of said at least one monomer.

22. A method of producing a filled polymeric material, said method comprising the steps:

(1) obtaining a polymer precursor mixture consisting essentially of:
   (a) at least one monomer capable of polymerizing to form a thermosetting polymeric material;
   (b) nano-porous inorganic gel material, said inorganic gel material having a sufficient degree of porosity for said at least one monomer such that said at least one monomer enters the pores of said inorganic gel material, and such that said inorganic gel material is capable of bonding to said thermosetting polymeric material upon polymerization; and (2) polymerizing said at least one monomer so as to form a thermosetting polymeric material, causing said inorganic gel material to bond to said thermosetting polymeric material.

23. A filled polymeric material, said material comprising:

a polyimide material formed by the polymerization of at least one monomer, said polyimide material containing a nano-porous inorganic silica gel material, said inorganic silica gel material having a sufficient degree of porosity for said at least one monomer such that said at least one monomer enters the pores of said inorganic silica gel material, and such that said inorganic silica gel material is capable of bonding to said polyimide material during said polymerization of said at least one monomer.

24. A method of producing a filled polymeric material, said method comprising the steps:

(1) obtaining a polymer precursor mixture comprising:
   (a) at least one monomer capable of polymerizing to form a polyimide material;
   (b) a nano-porous inorganic silica gel material, said inorganic silica gel material having a sufficient degree of porosity for said at least one monomer such that said at least one monomer enters the pores of said inorganic silica gel material, and such that said inorganic gel material is capable of bonding to said thermosetting polymeric material upon polymerization; and (2) polymerizing said at least one monomer so as to form a polyimide material, causing said inorganic silica gel material to bond to said polyimide material.

25. A filled polymeric material, said material consisting essentially of:

a polyimide material formed by the polymerization of at least one monomer, said polyimide material containing a nano-porous inorganic silica gel material, said inorganic silica gel material having a sufficient degree of porosity for said at least one monomer such that said at least one monomer enters the pores of said inorganic silica gel material, and such that said inorganic silica gel material is capable of bonding to said polyimide material during said polymerization of said at least one monomer.

26. A method of producing a filled polymeric material, said method comprising the steps:

(1) obtaining a polymer precursor mixture consisting essentially of:
   (a) at least one monomer capable of polymerizing to form a polyimide material;
   (b) a nano-porous inorganic silica gel material, said inorganic silica gel material having a sufficient degree of porosity for said at least one monomer such that said at least one monomer enters the pores of said inorganic silica gel material, and such that said inorganic gel material is capable of bonding to said thermosetting polymeric material upon polymerization; and (2) polymerizing said at least one monomer so as to form a polyimide material, causing said inorganic silica gel material to bond to said polyimide material.

* * * * *

UNITED STATES PATENT AND TRADEMARK OFFICE
CERTIFICATE OF CORRECTION

PATENT NO. : 6,087,432
DATED : July 11, 2000
INVENTOR(S) : Lannutti, et. al.

It is certified that error appears in the above-identified patent and that said Letters Patent is hereby corrected as shown below:

In column 3, line 34, after the numeral "(2)", please insert the symbol -- ~ --.

In column 5, line 25, after the letter "(b)", please insert the letter -- a --.

Signed and Sealed this

Twenty-second Day of May, 2001

Attest:

NICHOLAS P. GODICI

Attesting Officer

Acting Director of the United States Patent and Trademark Office